United States Patent [19]

Uchino et al.

[11] 4,151,342

[45] Apr. 24, 1979

[54] PROCESS FOR PRODUCING FLUOROELASTOMER AND CROSSLINKED POLYMER THEREOF

[75] Inventors: Tetsuya Uchino; Michio Hisasue; Hiroaki Kojima, all of Yokohama, Japan

[73] Assignee: Asahi Glass Company Ltd., Tokyo, Japan

[21] Appl. No.: 860,198

[22] Filed: Dec. 13, 1977

[30] Foreign Application Priority Data

Dec. 16, 1976 [JP] Japan .................................. 51-150360

[51] Int. Cl.$^2$ .................... C08F 210/06; C08F 214/26
[52] U.S. Cl. ............................ 526/273; 204/159.22; 428/500; 526/18; 526/38; 526/50; 526/52.2; 526/52.3; 526/52.5; 526/89; 526/206
[58] Field of Search ......................... 526/255, 273, 146

[56] References Cited

U.S. PATENT DOCUMENTS

| | | | |
|---|---|---|---|
| 2,839,514 | 6/1958 | Shokal et al. | 526/273 |
| 3,431,245 | 3/1969 | Wolfgang et al. | 526/273 |
| 3,467,635 | 9/1969 | Brasen et al. | 526/255 |
| 3,697,218 | 10/1972 | Nakajima et al. | 526/273 |
| 3,718,558 | 2/1973 | Tabata et al. | 526/255 |
| 3,825,510 | 7/1974 | Yamamoto et al. | 526/255 |
| 3,892,641 | 7/1975 | Tabata et al. | 526/255 |
| 3,933,773 | 1/1976 | Foerster | 526/255 |

*Primary Examiner*—Harry Wong, Jr.
*Attorney, Agent, or Firm*—Oblon, Fisher, Spivak, McClelland & Maier

[57] ABSTRACT

A fluoroelastomer is produced by copolymerizing propylene, tetrafluoroethylene and glycidyl vinyl ether in the presence of a polymerization initiator.

2 Claims, 1 Drawing Figure

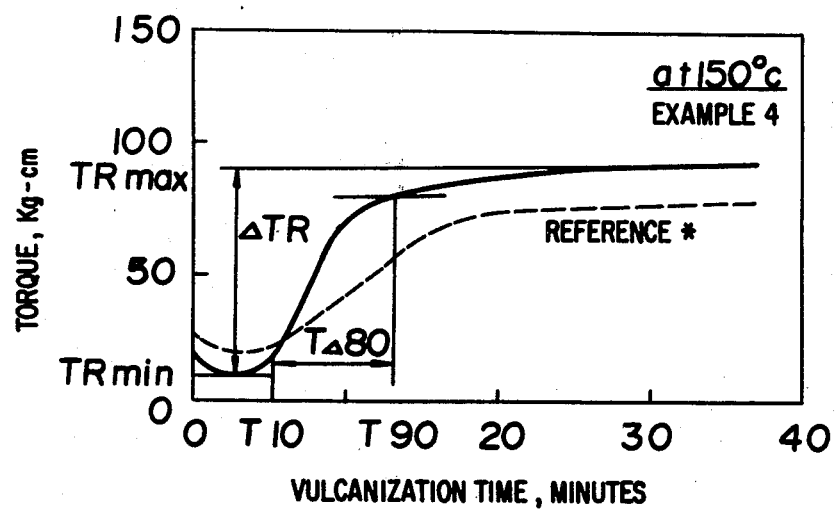

PROCESS FOR PRODUCING FLUOROELASTOMER AND CROSSLINKED POLYMER THEREOF

BACKGROUND OF THE INVENTION

1. Field of the Invention

The present invention relates to a process for producing a fluoroelastomer, more particularly, it relates to a process for producing a novel fluoroelastomer of propylene-tetrafluoroethylene-glycidyl vinyl ether terpolymer.

2. Description of Prior Art

It has been known that propylene-tetrafluoroethylene copolymers are excellent fluoroelastomers. (Japanese Patent Publication No. 24199/1968; U.S. Pat. No. 3,467,635 and B. Pat. No. 1,284,247)

Thus, the fluoroelastomers of propylene-tetrafluoroethylene copolymer, have excellent heat resistance and chemical resistance whereas they have inferior vulcanization properties.

In order to improve the vulcanization properties, it has been proposed to incorporate a comonomer into the copolymer for forming crosslinkable parts such as chloroethyl vinyl ether, acrylic acid, tertiary butyl acrylate, and divinyl ether.

According to the study made by the inventors, it has been found that there remain some disadvantages in the vulcanization step of the above-mentioned known ternary systems, such as blistering, insufficient vulcanization rate and necessity of high vulcanization temperature, and that most of their resultant vulcanizates show inferior heat stability to those of the binary systems.

SUMMARY OF THE INVENTION

It is an object of the present invention to provide a process for producing a propylene-tetrafluoroethylene type terpolymer which has improved vulcanization properties.

It is another object of the present invention to improve the vulcanization properties of a propylene-tetrafluoroethylene type terpolymer without a deterioration of the heat resistance and the chemical resistance.

The foregoing and other objects of the present invention have been attained by providing a process for producing a fluoroelastomer by copolymerizing propylene, tetrafluoroethylene and glycidyl vinyl ether in the presence of a polymerization initiator to obtain a propylene-tetrafluoroethylene-glycidyl vinyl ether terpolymer.

DETAILED DESCRIPTION OF THE PREFERRED EMBODIMENTS

In accordance with the present invention, a novel fluoroelastomer which is vulcanizable and comprises 50 to 65 mole % of tetrafluoroethylene component, 35 to 50 mole % of propylene component and 0.01 to 10 mole % of glycidyl vinyl ether component was obtained. It is especially preferable to produce a fluoroelastomer comprising 53 to 60 mole % of tetrafluoroethylene component, 40 to 47 mole % of propylene component, and 0.2 to 5 mole % of glycidyl vinyl ether component. When the content of the glycidyl vinyl ether is too small, the improvement of the vulcanization properties is not enough whereas when it is too much, the heat resistance in aging is deteriorated and the cost of the raw materials is disadvantageously high.

The contents of tetrafluoroethylene and propylene are preferably selected from the above-mentioned range from the viewpoints of heat resistance, chemical resistance and easy availability.

The terpolymerization of the present invention can be a bulk polymerization, a suspension polymerization, an emulsion polymerization, and a solution polymerization. A conventional catalytic polymerization, a modified redox polymerization, and a high energy ionizing radiation polymerization can be adopted.

In the terpolymerization of tetrafluoroethylene, propylene and glycidyl vinyl ether, it is possible to add suitable other monomer such as ethylene, isobutylene, vinyl fluoride, vinylidene fluoride, hexafluoropropylene, fluorovinyl ether, alkyl vinyl ether, chlorotrifluoroethylene etc. The content of the other monomer component is usually less than 15 mole %. The molecular weight of the fluoroelastomer is preferably more than about 30,000 from the viewpoint of characteristics of the vulcanized product such as tensile strength. The molecular weight of the copolymer should not be too high from the viewpoints of both of the processability and the characteristics of the vulcanized product. It is optimum to produce the fluoroelastomer having a molecular weight of about 50,000 to 150,000.

The process of the present invention is carried out under various polymerization systems and polymerization conditions. It is possible to carry out the copolymerization in an organic solvent such as fluoro- or fluorochloro-saturated hydrocarbons e.g. trichloromonofluoromethane, trichlorotrifluoroethane and perfluorocyclobutane (Freon ® type solvents) and alcohols e.g. tertiary butanol. When the organic solvent is used, the copolymerization can be carried out at $-40°$ C. to $+150°$ C. under relatively low reaction pressure such as about 1 to 50 Kg/cm$^2$.

It is also possible to carry out the copolymerization in an aqueous medium by a suspension polymerization or an emulsion polymerization. In the emulsion polymerization, a perfluoroalkyl or perfluorochloroalkyl type dispersing agent is preferably used.

In the suspension polymerization and the emulsion polymerization, it is possible to use a dispersion stabilizer such as chlorinated hydrocarbons, liquid hydrocarbons, trichlorotrifluoroethane and tertiary butanol, a reaction accelerator and other additives.

Polymerization initiators such as peroxides, azo compounds and persulfates can be used. The copolymerization can be also carried out by a high energy ionizing radiation such as γ-ray resulted by cobalt-60.

In the copolymerization in an aqueous medium, it is possible to carry it out at about 50° to 100° C. under a pressure of about 5 to 200 Kg/cm$^2$. When a redox catalyst is used as a polymerization initiator, the copolymerization can be carried out at lower temperature such as $-20°$ C. to $+50°$ C.

The process of the present invention can be carried out by a batch system, a semi-continuous system or a continuous system. The polymerization conditions, polymerization operation and polymerization apparatus can be preferably selected depending upon the purpose and the polymerization system.

Thus, a transparent or white fluoroelastomer having rubber-like elasticity can be obtained. The fluoroelastomer having superior vulcanizability than that of the conventional propylene-tetrafluoroethylene copolymer (elastomer) can be obtained.

The resulting fluoroelastomer can be treated by various crosslinking agents such as organic peroxides and amines to crosslink it whereby a rubber like crosslinked product is obtained. It is possible to crosslink by high energy ionizing radiation such as γ-rays or electron rays. In this case, it is possible to add various crosslinking adjuvants, fillers and reinforcing agents to give various compositions for vulcanization.

The novel fluoroelastomers of the present invention an be vulcanized in various formulations under various conditions. It is especially characteristic to be vulcanizable at low temperature such as room temperature by selecting a specific formulation. Thus, the fluoroelastomers of the present invention can be also utilized as the room temperature vulcanizable elastomer.

When one of tertiary amines e.g. monoamines, polyamines or salts thereof or a mixture of the tertiary amine and a hydroxyl compound having at least one —OH group, is used as a vulcanizing agent, it is possible to vulcanize the elastomer at room temperature whereby the vulcanizing velocity is sufficiently high and vulcanized products having excellent heat stability can be obtained.

Suitable tertiary amines include benzyl dimethyl amine, α-methylbenzyl dimethyl amine, dimethyl aminomethyl phenol, tris (dimethyl aminomethyl) phenol, diethylaminopropyl amine, N-aminoethyl piperadine, ethyl methyl imidazole, triethylene diamine, N,N'-bis-(alkyl) piperadine, 4,4'-trimethylenedipyridine, 2,3-bis(2-pyridyl)-5,6-dihydropyradine, N-ethyl morphorine, 1,8-diaza bicyclo(5,4,0) undecene-7 and salts thereof.

Suitable hydroxyl compounds used with the tertiary amine include octanol, cyclohexanol, phenol, ethyleneglycol, propyleneglycol, polyethyleneglycol, polypropyleneglycol, hydroquinone, catechol, resorcinol, 2,2'-bis(4-hydroxyphenyl) propane[bisphenol A], 1,3,5-trihydroxybenzene, dihydroxynaphthalene, 4,4'-dihydroxydiphenyl, 4,4'-dihydroxystilbene, 2,2'-bis(4-hydroxyphenyl) butane [bisphenol B], 2,4-dihydroxybenzophenone, 2,4-dihydroxybenzoate, 4,4'-dihydroxydiphenylsulfone, 2-methyl resorcinol, trimethylol allyloxyphenol and tris(4-hydroxyphenyl) methane.

Other vulcanizing agents such as aromatic polyamines can be also used though chemical stability of crosslinkage is slightly inferior.

Suitable aromatic polyamines include xylene diamine, methaphenylene diamine, diamino-diphenyl methane and diaminodiphenyl sulfone.

It is also possible to use alicyclic or heterocyclic polyamines such as menthane diamine and bisaminopropyl tetraoxa-spiroundecene.

The typical formulations for vulcanization at room temperature are as follows.

| Fluoroelastomer | 100 wt. parts |
| --- | --- |
| M T-carbon black | 5 to 60 wt. parts |
| Hydroquinone | 0.2 to 2 wt. parts |
| Tris(dimethylaminomethyl) phenol | 0.2 to 2 wt. parts |

These components are blended on a mixing roll mill and the blended composition is kept at room temperature for 3 to 14 days to obtain a vulcanized elastomer having enough strength such as tensile strength of higher than 100 Kg/cm$^2$. It is possible to improve the heat resistance by incorporating a metal oxide or silica.

It is also possible to prepare a solution paint by dissolving the composition in a suitable solvent. A vulcanized rubber coat having high strength can be obtained by coating the solution paint and maintaining it for 3 to 14 days after the coating.

Suitable solvents include ethyl acetate, tetrahydrofuran, and 1,1,2-trichlorotrifluoroethane.

Various additives used in the conventional crosslinking processes can be also added in the crosslinking process of the fluoroelastomer of the present invention. These additives include metal oxides such as magnesium oxide and lead oxide; reinforcing agents such as carbon black and fine silica; other fillers; pigments; antioxidants and stabilizers.

When the additive is added to the fluoroelastomer, it is preferable to uniformly mix it with the fluoroelastomer.

The mixing operation is usually carried out by using the conventional rubber blending roll mill and Bumbary mixer, the condition for the mixing operation is not critical. The additives can be thoroughly dispersed in the fluoroelastomer. It is preferable to select the optimum condition and operation in the mixing operation depending upon the kinds of the raw materials and the ratios thereof and the purposes.

The fluoroelastomer obtained by the process of the present invention can be vulcanized at the conventional high temperature of 100° to 250° C. as well as at room temperature. The above-mentioned vulcanizing agents and adjuvants can be used.

The heat crosslinking process using the chemical crosslinking agent can be the conventional process. For example, the mixture is heated in a mold by means of a conventional press, transfer and injection molding, or the mixture is fabricated by the extrusion process followed by heating in an air or steam oven or other device. It is preferable to select the optimum condition in the heat crosslinking process depending upon the kinds of the raw materials and the ratios thereof. The temperature in the crosslinking process is usually in a range of about 80° to 250° C. preferably about 120° to 200° C. The time for heating is not critical and it is usually in a range of 1 minute to 2 hours preferably 3 minutes to 2 hours depending upon the kind of the chemical crosslinking agent. When the temperature is high, the time for heating can be short. The crosslinked copolymer can be post cured improve its physical properties. For example, the post cure treatment is carried out at 150° to 250° C. preferably 180° to 230° C. for about 15 to 25 hours.

The crosslinked fluoroelastomers produced by the process of the present invention have high heat resistance and chemical resistance as well as high solvent resistance except for certain solvents of such as lower alkane, ketones and esters. Accordingly, the crosslinked fluoroelastomers can be effectively used for various usages requiring elasticity in various conditions for the uses, for example, O-ring for cars, gaskets, valve-stem seals, diaphragms, sealings for dry-cleaning apparatus, pipe, flexible joints, hoses for chemical industrial uses, rolls, packings and grooves. The crosslinked fluoroelastomers are especially useful as the materials which contact with an oil, a solvent or a corrosive liquid. The crosslinked fluoroelastomers can be molded in a form of pipe or rod and they can be also processed as a primary step to form a film or a tape which is further processed by a lamination, a coating and a wind-wrapping as the secondary step.

The following examples are intended merely to describe specific embodiments of the present invention and are not to be construed as a limitation on the scope of the invention.

EXAMPLE 1

In a 1 liter autoclave equipped with a stirrer, 375 g of water (oxygen is removed), 60 g of tertiary butanol, 2.9 g of ammonium perfluorooctanate, 1.5 g of ammonium persulfate, 0.4 g of sodium thiosulfate and 0.3 g of ferrous sulfate were charged and then 0.15 g of sodium hydroxide was added to adjust pH to 9.5. The autoclave was purged with nitrogen, 0.9 g (0.009 mole) of glycidyl vinyl ether(GVE) 5.6 g (0.13 mole) of propylene (P) and 80 g (0.8 mole) of tetrafluoroethylene (4F) were charged under spontaneous pressure.

The mixture was stirred at 300 rpm and the temperature in the autoclave was raised to 35° C. When the reaction was initiated to decrease the pressure, the monomer mixed gas of 4F, P and GVG of molar ratios of 53:45:2 was charged to maintain the pressure of 26 Kg/cm$^2$ for 8 hours. After the reaction, the remained monomers were purged and the resulting latex was discharged and 1% aqueous solution of CaCl$_2$ added to coagulate and the product was washed and dried to obtain 81.0 g of a polymer.

The resulting polymer had molar ratios of 54.1:43.8:2.1 of tetrafluoroethylene(4F) component, propylene(P) component and glycidyl vinyl ether(GVE) component (NMR analysis), and had about 30% hydrated glycidyl groups (IR analysis).

The copolymer had an average number molecular weight of 75,000 and mooney viscosity (ML$_{1+4}$) at 100° C. of 68 and a Shore A hardness of 45.

A vulcanization was carried out by admixing 100 wt.parts of a copolymer with 1 wt.part of hydroquinone, 0.5 wt.part of tris(dimethylaminomethyl) phenol, 25 wt.parts of MT carbon and 10 wt.parts of lead oxide and press-vulcanizing the mixture at 150° C. under the pressure of 100 Kg/cm$^2$ for 20 minutes. The product was taken out from the mold and was heated at 200° C. for 22 hours in an oven to vulcanize it. The main mechanical properties of the vulcanized product and the test result of heat aging test are shown in Table 1.

EXAMPLE 2

In accordance with the process of Example 1 except charging 0.45 g(0.0045 mole) of glycidyl vinyl ether at the initiation and charging the monomer mixed gas of 4F, P and GVE of molar ratios of 51:45:1, during the reaction. The copolymerization was carried out for 6 hours to obtain 69.8 g of the polymer having molar ratios of 53.1:45.8:1.1 of 4F component, P component and GVE component and an average number molecular weight of 69,000, and mooney viscosity (ML$_{1+4}$) at 100° C. of 77.

In accordance with the process of Example 1, the vulcanization of the resulting polymer was carried out and the physical properties of the vulcanized product were tested. The results are shown in Table 1.

EXAMPLE 3

In accordance with the process of Example 1 except using 2 wt.parts of diaminodiphenyl methane instead of hydroquinone and tris(dimethyl aminomethyl) phenol, the vulcanization of the resulting polymer was carried out and the physical properties of the vulcanized product were tested. The results are shown in Table 1.

Table 1

| | Example 1 | | | | |
|---|---|---|---|---|---|
| | No aging | Aging 260° C. 5 days | Ex.2 | Ex.3 | Reference* |
| Tensile strength (Kg/cm$^2$) | 235 | 205 | 178 | 203 | 137 |
| Elongation (%) | 198 | 150 | 260 | 230 | 218 |
| 100% modulus (Kg/cm$^2$) | 82 | 140 | 48 | 66 | 38 |
| Hardness (Shore A) | 77 | 78 | 72 | 75 | 73 |
| Compression permanent strain (%) 200° C. . 22 hours | 49 | — | 31 | 24 | 66 |

*Reference

A copolymer of tetrafluoroethylene, propylene and chloroethyl vinyl ether(CEVE) (CEVE is used for crosslinkage) which had molar ratio of 54:44:2 of 4F component, P component and CEVE component and an average number molecular weight of 76,000, was vulcanized under the following condition. The physical properties of the vulcanized product are shown in Table 1.

Foaming of the polymer in the vulcanization was found and the surface of the vulcanized product was not smooth.

| Composition | |
|---|---|
| Fluoroelastomer | 100 wt. parts |
| MT-carbon | 20 wt. parts |
| MgO | 15 wt. parts |
| Tetraethylene pentaamine | 2 wt. parts |
| Vulcanization | |
| Press vulcanization | 180° C. . 30 min. |
| Oven vulcanization | 204° C. . 20 hours |

EXAMPLE 4

A vulcanization of the composition of Example 2 was carried out by an oscillating disc sheometer at 150° C. The vulcanization curve is shown in FIG. 1 together with the result of Reference.**

From the vulcanization curves, the superiority of effect of glycidyl vinyl ether as crosslinkage to that of of the conventional one is clearly found.

| ** Reference | |
|---|---|
| Copolymer of 4F, P and CEVE (molar ratio of 54:44:2) | |
| Average number molecular weight | 76,000 |
| Composition | |
| Fluoroelastomer | 100 wt. parts |
| MT carbon | 20 wt. parts |
| MgO | 15 wt. parts |
| Tetraethylene pentaamine | 2 wt.parts |

EXAMPLE 5

The composition of Example 1 was kept at room temperature for 7 days or 14 days. The physical properties of the resulting vulcanized products were tested. The results are shown in Table 2.

EXAMPLE 6

The composition of Example 2 was also kept at the room temperature for 7 days and the physical properties of the resulting vulcanized product were tested. The result is shown in Table 2.

It was found that the vulcanization at room temperature could be easily performed by introducing the glycidyl group having high reactivity in the polymer though it was not attained by the conventional crosslinking parts.

Table 2

| | Example 5 | | | Exp.6 |
|---|---|---|---|---|
| | 150° C. 20min. 200° C. 22hr. | R.T. 7 days | R.T. 14 days | 7 days |
| Tensile strength (Kg/cm$^2$) | 235 | 141 | 165 | 108 |
| Elongation (%) | 198 | 253 | 220 | 360 |
| 100% modulus (Kg/cm$^2$) | 82 | 47 | 53 | 40 |
| Hardness (Shore A) | 77 | 75 | 76 | 73 |

EXAMPLE 7

The chemical resistances of the vulcanized fluoroelastomers obtained in Examples 2 and 3 and the vulcanized fluoroelastomer obtained in Reference which had crosslinking part of CEVE. The chemical resistance was tested by dipping the product in the chemical liquid under specific conditions and measuring volumetric expansion coefficient. The results are shown in Table 3. The vulcanized products were prepared as follows.

| | Ex.4-A | Ex.4-B | Ref. A | Ref. B |
|---|---|---|---|---|
| Polymer: | | | | |
| 4F/P/GVE (molar ratio 53.1 : 45.8 : 1.1) (MW 69,000) | 100 | — | — | — |
| 4F/P/GVE (molar ratio 54.1 : 43.8 : 2.1) (MW 75,000) | — | 100 | — | — |
| 4F/P/CEVE (molar ratio 54 : 44 : 2) (MN 76,000) | — | — | 100 | — |
| 4F/P (molar ratio 55 : 45) (MW 180,000) | — | — | — | 100 |
| Vulcanizer: | | | | |
| hydroquinone | 1 | — | — | — |
| tris(dimethylaminomethyl) phenol | 0.5 | — | — | — |
| diaminodiphenyl methane | — | 2 | — | — |
| tetraethylenepentamine | — | — | 2 | — |
| α,α'-bis(t-butylperoxy)-p-diisopropyl benzene | — | — | — | 2 |
| tri-allyl isocyanurate | — | — | — | — |
| MT carbon | 25 | 25 | 20 | 25 |
| MgO | — | — | 15 | — |
| PbO | 10 | 10 | — | 10 |
| Vulcanization: | | | | |
| Press vulcanization | 150° C. 20 min | 150° C. 20 min | 180° C. 30 min | 150° C. 40 min |
| Oven vulcanization | 200° C. 22 hr | 200° C. 22 hr | 204° C. 20 hr | 200° C. 20 hr |

Table 3

| Chemical liquid | Dipping Condition ° C. days | Exp. 4-A 4F/P/GVE | Exp. 4-B 4F/P/GVE | Ref. A 4F/P/CEVE copolymer | Ref. B 4F/P copolymer |
|---|---|---|---|---|---|
| H$_2$SO$_4$(96%) | 100° C. 3 day | 5.3 | 4.1 | 12 | 4.4 |
| HNO$_3$ (60%) | " | 27 | 107 | *** | 34 |
| NaOH (50%) | " | −0.2 | −0.3 | 30 | 1.1 |
| ASTM #3 oil | 175° C. 3 days | 11 | 9 | 13 | 15 |
| Fuel oil 13 | R.T. 7 days | 55 | 50 | 56 | 58 |

*** decomposed

EXAMPLE 8

The terpolymer having 1.1 mole of glycidyl vinyl ether component obtained in Example 2 was admixed with various vulcanizing agents and the vulcanizing conditions were tested by the oscillating disc rheometer. The results are shown in Table 4.

Table 4

| | | 1 | 2 | 3 | 4 | 5 | 6 | 7 | 8 | 9 |
|---|---|---|---|---|---|---|---|---|---|---|
| Fluoroelastomer | | 100 | 100 | 100 | 100 | 100 | 100 | 100 | 100 | 100 |
| MT carbon | | 35 | 35 | 35 | 35 | 35 | 35 | 35 | 35 | 35 |
| MgO | | | | | | | | | | 10 |
| Triethylenediamine | | 2 | | | | | | | | |
| Benzyl dimethyl amine | | | 1 | | | | | | | |
| Tris(dimethyl aminomethyl) phenol | | | | 1 | 1 | 1 | 0.5 | | | |
| Diazabicyclo undecene | | | | | | | | | 0.5 | |
| Ethyleneglycol | | | | 1 | | | | | | |
| Phenol | | | | | 1 | | | | | |
| Hydroquinone | | | 1 | | | 1 | 1 | 1 | | |
| Diaminodiphenyl methane | | | | | | | | | 2 | 2 |
| ODR Test result 150° C. | T$_{10}$ | 1.7 | 3.1 | 1.4 | 1.0 | 0.9 | 1.5 | 0.8 | 0.5 | 1.8 |
| | T$_{90}$ | 14.5 | 24.2 | 13.4 | 9.7 | 12.5 | 13.0 | 10.7 | 9.5 | 16.6 |
| | T$_{\Delta 80}$ | 12.8 | 21.1 | 12.0 | 8.7 | 11.6 | 11.5 | 9.9 | 8.6 | 14.8 |
| | TR min. | 9.0 | 14 | 13 | 13 | 19 | 13 | 18 | 39 | 42 |
| | TR max. | 77 | 33 | 83 | 84 | 114 | 86 | 101 | 122 | 128 |

Table 4-continued

|  | 1 | 2 | 3 | 4 | 5 | 6 | 7 | 8 | 9 |
|---|---|---|---|---|---|---|---|---|---|
| ΔTR | 68 | 19 | 70 | 71 | 95 | 73 | 83 | 83 | 86 |

What is claimed is:

1. An uncured fluoroelastomer carbo-polymerized copolymer of composition 50 to 65 mole % tetrafluoroethylene, 35 to 50 mole % propylene and 0.01 to 10 mole % glycidylvinyl ether monomer wherein said fluoroelastomer copolymer contains side chains with unreacted glycidyl groups which are derived from said glycidylvinyl ether monomer.

2. The fluoroelastomer copolymer of claim 1 wherein the amount of glycidyl vinyl ether component is 0.2 to 5 mole %.

* * * * *